US009304844B2

(12) United States Patent
Bansal et al.

(10) Patent No.: US 9,304,844 B2
(45) Date of Patent: Apr. 5, 2016

(54) SYSTEM AND METHOD FOR PRESERVING CRITICAL DEBUG DATA IN A PORTABLE COMPUTING DEVICE

(71) Applicant: QUALCOMM Incorporated, San Diego, CA (US)

(72) Inventors: Kapil Bansal, San Diego, CA (US); Girish Bhat, San Diego, CA (US); Subodh Singh, San Diego, CA (US); Victor Wong, San Diego, CA (US); Pradeep Atur, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 223 days.

(21) Appl. No.: 13/779,627

(22) Filed: Feb. 27, 2013

(65) Prior Publication Data

US 2014/0245076 A1 Aug. 28, 2014

(51) Int. Cl.
*G06F 11/36* (2006.01)
*G06F 11/07* (2006.01)

(52) U.S. Cl.
CPC ........ *G06F 11/0742* (2013.01); *G06F 11/0757* (2013.01); *G06F 11/366* (2013.01); *G06F 11/3648* (2013.01); *G06F 11/3656* (2013.01)

(58) Field of Classification Search
CPC .............. G06F 11/362; G06F 11/3648; G06F 11/3652; G06F 11/3656
USPC ......................................... 714/48, 49, 55, 56
See application file for complete search history.

(56) References Cited

U.S. PATENT DOCUMENTS

| | | | | |
|---|---|---|---|---|
| 4,809,280 A | * | 2/1989 | Shonaka | ........................ 714/55 |
| 5,553,301 A | * | 9/1996 | New et al. | ......................... 710/5 |
| 5,768,496 A | * | 6/1998 | Lidgett et al. | .................... 714/25 |
| 6,336,174 B1 | * | 1/2002 | Li et al. | ......................... 711/162 |
| 6,795,963 B1 | | 9/2004 | Andersen et al. | |
| 7,149,926 B2 | * | 12/2006 | Ahmad | ............... G06F 11/3656 714/10 |
| 7,627,784 B1 | * | 12/2009 | Allen | .................. G06F 11/3636 714/30 |
| 8,275,975 B2 | | 9/2012 | Ors et al. | |
| 8,751,744 B2 | * | 6/2014 | Deleris | ................. G06F 11/364 711/118 |
| 8,856,600 B2 | * | 10/2014 | Zadigian | ................ G01R 31/28 714/724 |
| 8,966,319 B2 | * | 2/2015 | Fai | ........................ G06F 11/362 714/42 |
| 2004/0019828 A1 | * | 1/2004 | Gergen et al. | .................... 714/30 |
| 2010/0070803 A1 | * | 3/2010 | Carlson et al. | .................. 714/30 |
| 2010/0281304 A1 | | 11/2010 | Moyer et al. | |
| 2011/0035618 A1 | * | 2/2011 | Jann et al. | .......................... 714/3 |
| 2013/0007532 A1 | * | 1/2013 | Miller et al. | .................... 714/45 |
| 2014/0075249 A1 | * | 3/2014 | Sato | .................... G06F 11/3471 714/45 |
| 2014/0237454 A1 | * | 8/2014 | Delporte | ............ G06F 11/3636 717/128 |

* cited by examiner

*Primary Examiner* — Joseph Schell
(74) *Attorney, Agent, or Firm* — Smith Risley Tempel Santos LLC

(57) ABSTRACT

One or more triggers may be coupled to sources on a system on a chip of a portable computing device. The sources monitor the system for status conditions. The one or more triggers are coupled to a trigger bus. A sequencer engine is coupled to the trigger bus and a communication bus. The sequencer engine receives one or more instructions from the communication bus for determining how the sequencer engine should monitor the one or more triggers via the trigger bus and preserve data received from the one or more triggers before a system reset. The sequencer engine then receives data from the one or more triggers and stores the data in local memory storage. The sequencer engine, if programmed, may generate at least one of a trace packet, an interrupt signal, and a general purpose input/output signal in response to receiving data from one or more triggers.

40 Claims, 6 Drawing Sheets

US 9,304,844 B2

SYSTEM AND METHOD FOR PRESERVING CRITICAL DEBUG DATA IN A PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

To support multiple and complex application programs, PCDs usually have Systems on a Chip ("SoC") that include multi-core processors. With such hardware, PCDs are basically compact, handheld computers that may be prone to hang (i.e. "freeze") during execution of one or more programs. A system in a PCD may hang/stop/delay for any number of reasons (i.e., "bugs") including, but not limited to, intermittent hardware ("HW") performance, mismatched hardware resulting from a HW upgrade, defective hardware, incorrect program terminations in a software ("SW") loop, ineffective yields between tasks of complimentary SW applications (i.e., infinite loops of SW threads waiting on events that cannot occur), a race condition on a communication bus, etc.

As a result of a bug that causes a system to hang, the system may further enter into a runaway state that leads to system timeouts and eventual resets. Meanwhile, timeouts and resets within an SoC usually cause loss of data that may have identified what bugs may have caused the timeout or system hang.

The inability to identify the source of a hang or a bug may adversely affect the product development cycle of a PCD. Often, not being able to identify a bug in a system may unnecessarily prolong an introduction of a PCD into the marketplace. Therefore, because critical debug data is often lost during a reset process that may occur in a PCD in response to a hang, what is needed in the art is a system and method for identifying sources that caused the system hang and preserving this critical debug data. Critical debug data may include, but is not limited to, state or status information before a system reset occurs.

SUMMARY OF THE DISCLOSURE

According to one exemplary aspect of the system and method, one or more triggers are coupled to sources within a system on a chip of a portable computing device. The sources monitor the system for status conditions. The one or more triggers are coupled to a trigger bus. A sequencer engine is coupled to the trigger bus and a communication bus. The sequencer engine receives one or more instructions from the communication bus for determining how the sequencer engine should monitor the one or more triggers and preserve data received from the one or more triggers before a system reset. The sequencer engine then receives data from the one or more triggers and stores the data in local memory storage.

The sequencer engine, if programmed, may generate at least one of a trace packet, an interrupt signal, and a general purpose input/output signal in response to receiving data from one or more triggers. The data from the one or more triggers is usually received before a system reset. After a system reset, debugging software may access the local memory storage coupled to and used by the sequencer engine. The debugging software may generate a request for more detailed and comprehensive debug data based on the data contained in the local memory storage. This request for more detailed and comprehensive debug data may be sent over a debug bus.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device by itself may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a personal digital assistant ("PDA"), a smartphone, a navigation device, or a hand-held computer, like a tablet PC, with a wireless connection or link.

Figure 1A:
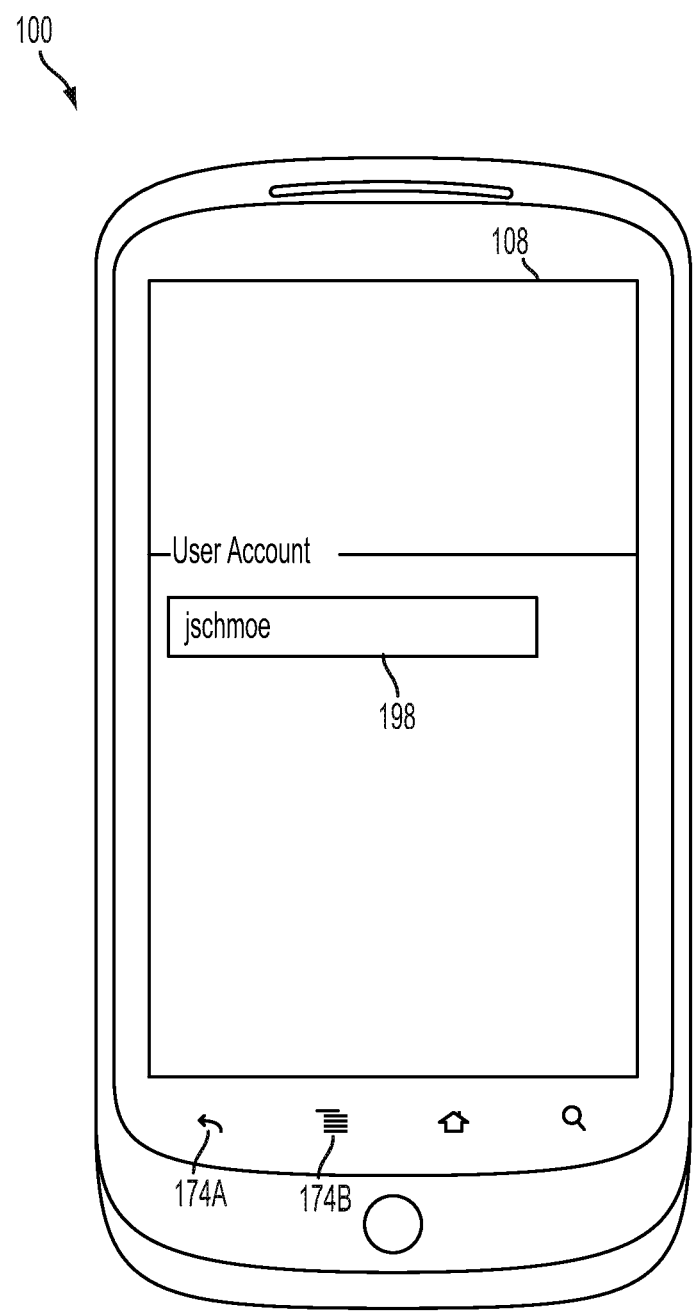
FIG. 1A is a diagram of an exemplary wireless portable computing device ("PCD")

FIG. 1A is a diagram of an exemplary wireless portable computing device ("PCD") 100. The PCD 100 may include a touchscreen display 108. The touchscreen display may provide for user input and output. In the exemplary embodiment of FIG. 1A, display output 198 comprising a log-in screen in which a user may input his or her credentials in the form of alphanumeric text is provided. The PCD 100 may include a keypad as well as special function buttons 174A, 174B that allow a user to invoke various commends as understood by one of ordinary skill in the art.

Figure 1B:
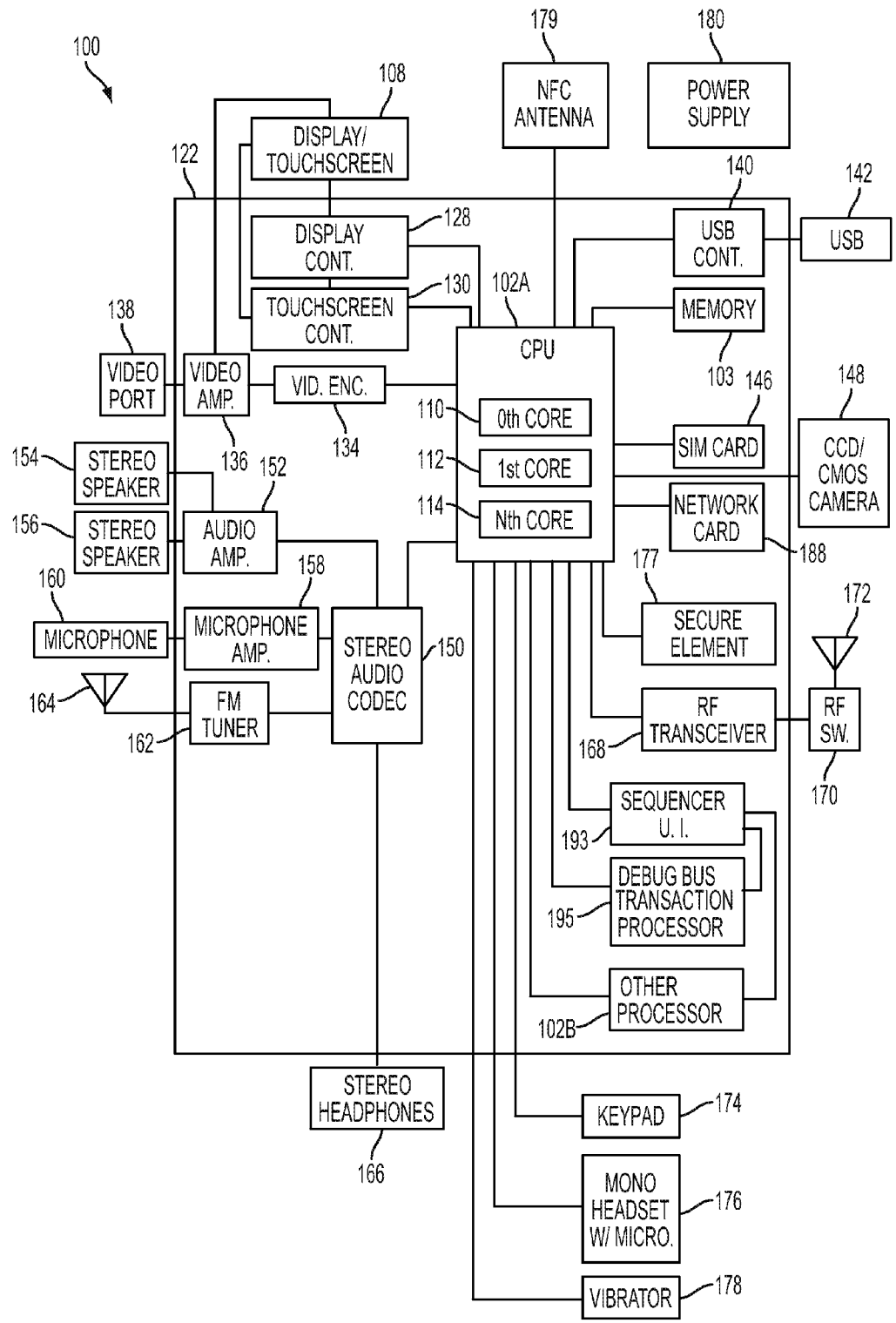
FIG. 1B is a functional block diagram illustrating an exemplary wireless portable computing device ("PCD") that may have or may embody a system and method for preserving critical debug data.

FIG. 1B is a functional block diagram illustrating an exemplary wireless portable computing device ("PCD") 100 that may have and/or embody a system and method for preserving critical debug data. As shown, the PCD 100 includes an on-chip system or system-on-chip ("SoC") 122 design that includes a multicore CPU 102A. The multicore CPU 102 may include a zeroth core 110, a first core 112, and an Nth core 114 as understood by one of ordinary skill in the art.

As illustrated in FIG. 1B, a display controller 128 and a touch screen controller 130 are coupled to the multicore CPU 102. In turn, a display 108 external to the on-chip system 122 is coupled to the display controller 128 and the touch screen controller 130. An NFC antenna 179 may be coupled to the CPU 102 and may support functions that work in combination with a secure element module 177. The secure element module 177 may comprise software and/or hardware and/or firmware as understood by one of ordinary skill in the art.

FIG. 1B further shows that a video encoder 134, e.g., a phase alternating line ("PAL") encoder, a sequential color a memoire ("SECAM") encoder, or a national television system(s) committee "(NTSC") encoder, is coupled to the multicore CPU 102. Further, a video amplifier 136 is coupled to the video encoder 134 and the touch screen display 108. Also, a video port 138 is coupled to the video amplifier 136. As shown in FIG. 1B, a universal serial bus ("USB") controller 140 is coupled to the multicore CPU 102A. Also, a USB port 142 is coupled to the USB controller 140. Memory 103 and a subscriber identity module ("SIM") card 146 may also be coupled to the multicore CPU 102.

Further, as shown in FIG. 1B, a camera 148 may be coupled to the multicore CPU 102A. In an exemplary aspect, the camera 148 is a charge-coupled device ("CCD") camera or a complementary metal-oxide semiconductor ("CMOS") camera.

As further illustrated in FIG. 1B, a stereo audio coder-decoder ("CODEC") 150 may be coupled to the multicore CPU 102A. Moreover, an audio amplifier 152 may coupled to the stereo audio CODEC 150. In an exemplary aspect, a first stereo speaker 154 and a second stereo speaker 156 are coupled to the audio amplifier 152.

FIG. 1B shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1B further illustrates that a radio frequency (RF) transceiver 168 may be coupled to the multicore CPU 102A. An RF switch 170 may be coupled to the RF transceiver 168 and an RF antenna 172. A keypad 174 may be coupled to the multicore CPU 102A. Also, a mono headset with a microphone 176 may be coupled to the multicore CPU 102A. Further, a vibrator device 178 may be coupled to the multicore CPU 102A. FIG. 1B also shows that a power supply 180 may be coupled to the on-chip system 122. In a particular aspect, the power supply 180 is a direct current ("DC") power supply that provides power to the various components of the PCD 100 that require power. Further, in a particular aspect, the power supply is a rechargeable DC battery or a DC power supply that is derived from an alternating current ("AC") to DC transformer that is connected to an AC power source.

FIG. 1B further shows that the PCD 100 may also include a network card 188 that may be used to access a data network, e.g., a local area network, a personal area network, or any other network. The network card 188 may be a Bluetooth network card, a WiFi network card, a personal area network (PAN) card, a personal area network ultra-low-power technology (PeANUT) network card, or any other network card well known in the art. Further, the network card 188 may be incorporated into a chip, i.e., the network card 188 may be a full solution in a chip, and may not be a separate network card 188.

The SoC 122 may further comprise another processor 102B, that could include a second multicore processor 102B. This other processor 102B may be coupled to the first processor 102A. The SoC may further comprise a sequencer user interface module 193 and a debug bus transaction processor module 195 which are coupled to the first processor 102A. Further details of the other processor 102B, the sequencer user interface module 193 and debug bus transaction processor module 195 will be described below in connection with FIG. 2.

As depicted in FIG. 1B, the display 108, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator device 178, and the power supply 180 are external to the on-chip system 122.

In a particular aspect, one or more of the method steps described herein may be stored in the memory 103, the multicore CPU 102A, the other processor 102B, as well as in the sequencer user interface module 193, the debug bus transaction processor module 195, and other storage devices as computer program instructions. These instructions may be executed by the multicore CPU 102A, the other processor 102B, sequencer user interface module 193, the debug bus transaction processor module 195 in order to perform the methods described herein. Further, the multicore CPU 102, the multicore CPU 102A, the other processor 102B, sequencer user interface module 193, the debug bus transaction processor module 195, or a combination thereof may serve as a means for executing one or more of the method steps described herein.

Figure 2:
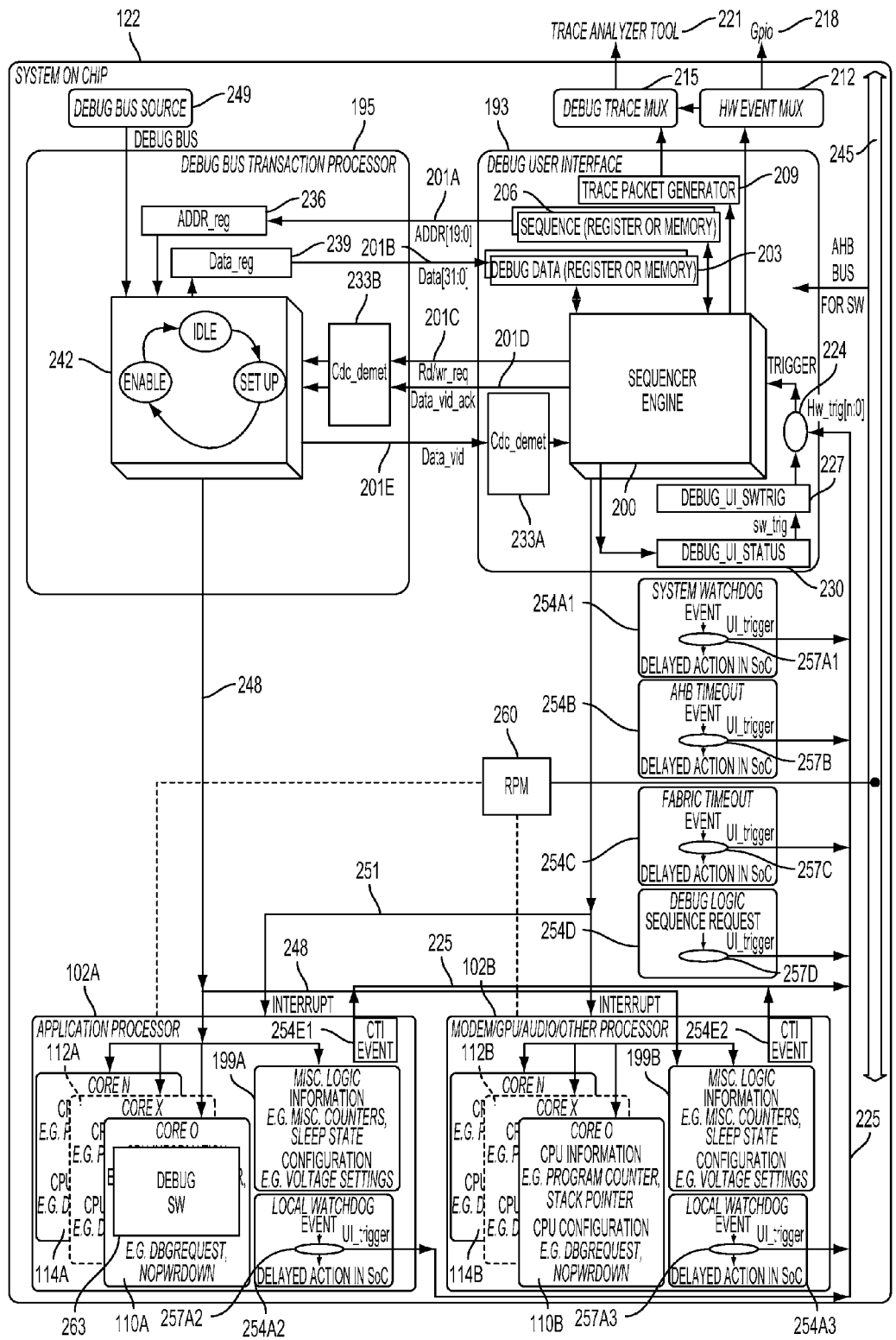
FIG. 2 is a functional block diagram illustrating exemplary hardware and software for preserving critical debug data for a System-on-Chip of a PCD.

FIG. 2 is a functional block diagram illustrating exemplary hardware and software for preserving critical debug data for a System-on-Chip ("SoC") 122 of a PCD 100. The SoC 122 may include hardware such as SNAPDRAGON™ chips, sold by QUALCOMM, INC as of this writing. In particular, this FIG. 2 shows further details of the sequencer user interface module 193 and the debug bus transaction processor module 195. According to one exemplary embodiment, each of these elements may comprise hardware such as dedicated signal processors ("DSPs") and/or application-specific integrated circuits ("ASICs"). One of ordinary skill the art recognizes that various substitutions in hardware and in software may be made for any of the elements described herein without departing from the scope of this disclosure.

The debug bus transaction processor module 195 may be coupled to the sequencer user interface module 193. These two elements may be coupled together by various communication buses 201A-E as understood by one of ordinary skill the art. One function of the debug bus transaction processor module 195 is that it serves to retrieve data for the sequencer user interface module 193 along the debug bus 248. The debug bus transaction processor module 195 may serve as a translator for the sequencer user interface module 193 in order to collect data for the sequencer user interface module 193. Usually, such data requests from the sequencer user interface module 193 are made after an error/fault or hang condition has occurred within the SoC 122 as will be described in more detail below.

The debug bus transaction processor module 195 may be coupled to the application processor 102A, the other processor 102B, and a debug bus source 249 by a debug bus 248. The debug bus source 249 may comprise a system bus fabric such as, but not limited to, an ARM™ brand advanced high performance bus ("AHB"), an Advanced eXtensible Interface ("AXI") bus, and/or a system network on chip ("SNOC") bus as understood by one of ordinary skill the art. As illustrated in FIG. 2, the other processor 102B may comprise any one of a modem, a graphical processing unit, or an audio processor as understood by one of ordinary skill the art. Both the other processor 102B and the application processor 102A may include multiple cores 110, 112, 114 as described above in connection with FIG. 1B.

The sequencer user interface module 193 may be coupled to the application processor 102A and the other processor 102B by an interrupt bus 251. The sequencer user interface module 193 may also be coupled to the application processor 102A and the other processor 102B by a trigger event bus 225. Further, the sequencer user interface module 193 may be coupled to the application processor 102A and the other processor 102B by an advanced high-performance ("AHB") bus 245. The trigger event bus 225 may also couple the sequencer user interface module 193 to various SoC monitoring sources 254.

SoC monitoring sources 254 may comprise hardware and/or software used to detect various conditions of elements contained within the SoC 122. For example, the trigger event bus 225 may couple the sequencer user interface module 193 to SoC monitoring sources 254 such as, but not limited to, a system watchdog timer module 254A1, an AHB bus timeout module 254B, a fabric timeout module 254C, a debug logic module 254D, and a cross trigger interface ("CTI") module 254E, just to name a few.

The system watchdog timer module 254A may comprise a hardware logic distributed throughout an SoC 122 and that supports such functions as a program counter as understood by one of ordinary skill the art. The system watchdog timer module 254 may order or issue a command to reset the SoC 122 when it detects a hardware element has timed out. The SoC 122, generally, may have its own system watchdog timer module 254A1, while the processors 102A and 102B, may also have their own respective local watchdog timer modules 254A2, 254A3.

The AHB bus timeout module 254B may comprise a hardware element responsible for tracking fault and/or error conditions with respect to the AHB bus 245 of the SoC 122 as understood by one of ordinary skill the art. The AHB bus timeout module may monitor communications over the AHB bus 245 between masters and slave elements as understood by one of ordinary skill in the art. For example, the AHB bus timeout module 254B may detect when a request has been issued by a master and when a slave times out and does not respond to the request issued by the master. The AHB bus timeout module 254B may also issue fake completion of interrupts as appropriate as understood by one of ordinary skill in the art.

The fabric timeout module 254C may comprise a hardware element responsible for tracking fault and/or error conditions with respect to a system switch fabric of the SoC 122 as understood by one of ordinary skill the art. The system switch fabric comprises another type of bus for an SoC 122 as understood by one of ordinary skill in the art.

The debug logic module 254D may comprise a hardware logic distributed across the SoC 122 responsible for monitoring system states of hardware within the SoC 122. The debug logic module 245D may capture an error or change of status in the system for debugging purposes. For example, the debug logic module 254D may comprise an ARM™ CORESIGHT™ brand System Trace Macrocell ("STM") software/hardware for tracking hardware events, as understood by one of ordinary skill in the art. Once an error is detected, the debug logic module 254D will trigger sequencer user interface module 193 to capture the critical data in the ARM™ brand processor. In this case, the source of a problem may be determined based on the data captured with the sequencer user interface module 193. Another SOC monitoring source 254 may comprise one or more CTI modules 254E. Each CTI module 254E may be located within each processor 102, such as modules 254E2. These modules 254 may be responsible for tracking cross trigger interface events as understood by one of ordinary skill the art.

Each of these monitoring sources 254 for the SoC 122 may be supplied with a trigger 257. Each trigger 257 may comprise hardware and/or software logic for detecting errors. Errors may be detected by the system switch fabric and by processors 102A,B. Errors may include, but are not limited to, timeouts detected by AHB bus 245, expirations of the watchdog timer modules 254A, and/or any errors and/or interrupts detected by any processors, co-processors, bus logic, etc. as understood by one of ordinary skill in the art. Each trigger 257 may be designed for detecting specific conditions that may be tracked by each monitoring source 254. Each trigger 257 may also be coupled to the trigger event bus 225.

The output 224 of the trigger event bus 225 is coupled to a sequencer engine 200 of the sequencer user interface module 193. The sequencer engine 200 receives trigger event data produced by any one of the SoC monitoring sources 254 that are transmitted along the trigger an event bus 225. This trigger event data may be categorized, sorted, and stored by the sequencer engine 200 and the sequence memory module 206. The sequence memory module 206 may comprise one or more registers, however, other types of memory may be used without departing from the scope of this disclosure.

The sequencer engine 200 may comprise a hardware element, such as a processor or an application-specific integrated circuit. As will be described in further detail below, in addition to managing trigger event data received from the trigger event bus 225 and storing this data in its local memory module 206, the sequencer engine 200 may communicate with the debug bus transaction processor 193 in order to collect/retrieve debug data based on the trigger event data that is stored in the local memory module 206. The sequencer engine 200 is programmable and it may receive commands from debug software 263 which may be executed by one of the cores 110, 112, or 114 of the application processor 102A. Specifically, the debug software 263 may issue commands to the sequencer engine 200 along the AHB bus 245 and through a debug user interface status module 230 and a debug user interface software trigger module 227 which are coupled to the AHB bus 245.

The sequencer engine 200 may also issue commands to a trace packet generator 209 based on programming instructions that the engine 200 may receive from the debug software 263. The sequencer engine 200 may issue its commands to the trace packet generator 209 in response to certain trigger event data that it receives and which is identified/specified by the debug software 263. The trace packet generator 209 may generate trace packets and transmit those packets to a debug trace multiplexer 215. The debug trace multiplexer 215 may forward these packets onto a trace analyzer tool 221 as understood by one of ordinary skill in the art.

The sequencer engine 200 may also generate one or more interrupt signals in response to certain trigger event data that it receives and in accordance with programming instructions that the engine 200 may receive from the debug software 263. Such interrupt signals may be transmitted by the sequencer engine 200 along the interrupt bus 251 which is coupled to both the application processor 102A and the other processor 102B.

The sequencer engine 200 may also issue commands to a hardware event multiplexer 212 in accordance with programming instructions that the engine 200 may receive from the debug software 263. The hardware event multiplexer 212 may be responsible for generating general purpose input/output ("GPIO") signals 218 as understood by one of ordinary skill the art. The sequencer engine 200 may issue its commands to the hardware event multiplexer 212 in response to certain trigger event data that it receives and which is identified/specified by the debug software 263.

Generally, the debug software 263 identifies/identifies which trigger events before these events actually occur that will require the sequencer engine 200 to issue commands to the hardware event multiplexer 212 for generating GPIO signals 218, the trace packet generator 209 for generating packets, and for the sequencer engine 200 to generate interrupt signals along the interrupt bus 251. As understood by one of ordinary skill in the art, the debug software 263 cannot readily issue commands to the sequencer engine 200 when a fault/hang/error condition occurs because the application processor 102A and the cores 110, 112, 114 will usually be inoperable during such a condition. Therefore, the programming instructions from the debug software 263 that specifies/identifies events and/or other data are usually transmitted along the AHB bus 245 to the sequencer engine 200 prior to the occurrence of any events which are monitored by the triggers 257 as described above.

After the occurrence of one or more trigger events, the debug software 263 may access the sequencer engine 200 and its local memory storage 206 via the AHB bus 245. The local memory storage 206 may contain only a summary or a fine level of detail with respect to trigger events. In other words, the data about trigger events maintained in the local memory storage 206 may be abbreviated and it may only contain pointers or data addresses of where faults/error conditions/and/or hangs occurred in hardware and/or software during one or more trigger events.

The debug software 263 may issue commands to the sequencer engine 200 to use the data in the local memory storage 206 in order to request a fuller record or larger amount of information, such as context information, from the debug bus 248 based on the information stored in the local memory storage 206. The sequencer engine 200 via its sequence local memory storage 206 may request additional information from the debug bus 248 about a trigger event by using the address register 236 of the debug bus transaction processor 195.

When the address register 236 of the debug bus transaction processor module 195 receives the data request from the sequencer engine 200, it may relay this data request to the transaction processor engine 242. The transaction processor engine 242 may comprise hardware that is coupled to the debug bus 248 and the debug bus source to 249. The transaction processor engine 242 may also be coupled to a frequency synchronizer 233. The frequency synchronizer 233 aligns or compensates differences in operating frequencies between the sequencer engine 200 and the transaction processor engine 242. The frequency synchronizer 233 adjusts these frequencies to optimize for communications received from the sequencer engine 200 and the transaction processor engine 242. The sequencer engine 200 may also have its own frequency synchronizer 233 that adjusts for operating frequency differences for communications received from the transaction processor engine 242.

After the transaction processor engine 242 receives the data request from the address register 236, it may relay this request to the appropriate piece of software and/or hardware via the debug bus 248 based on the address contained in the request. With this address from the request, the debug bus 248 may poll or pull data from the piece of hardware and/or software that relates to the trigger event. For example, the debug bus 248 may pull or retrieve context data such as lines of code in software that are near or adjacent to the address recorded by the sequencer engine 200 in the sequence local memory storage 206.

After locating this context data, the debug bus 248 may relay this context data back to the transaction processor engine 242. The transaction processor engine 242 may relay this context information back through its data register 239 to the debug data local memory storage 203 that is part of the sequencer user interface module 193. The debug data local memory storage 203 may contain fuller records of data relating to trigger events compared to the trigger event data residing in the sequence local memory storage 206. This data contained within the debug data local memory storage 203 may be accessed by the debug software 263 via the sequencer engine 200.

From the debug data contained within the debug data local memory storage 203, the debug software 263 may generate one or more debug image files as understood by one of ordinary skill in the art. After these debug image files are created by the debug software 263, the debug software 263 may analyze these image files in order to identify errors and/or fault conditions within software and/or hardware.

The SOC 122 may further comprise a resource power manager ("RPM") 260. The RPM 260 may be responsible for managing power and reset conditions for all of the buses as well as the CPU 102A and other processor 102B. When a fault/error condition/hang occurs that causes either or both processors 102 to stop or halt, the RPM 260 may reset the hardware of the entire SOC 122 as appropriate. As mentioned previously, this system reset executed by the RPM 260 may erase any data that is contained within the volatile memory devices within the SOC 122.

Figure 3:
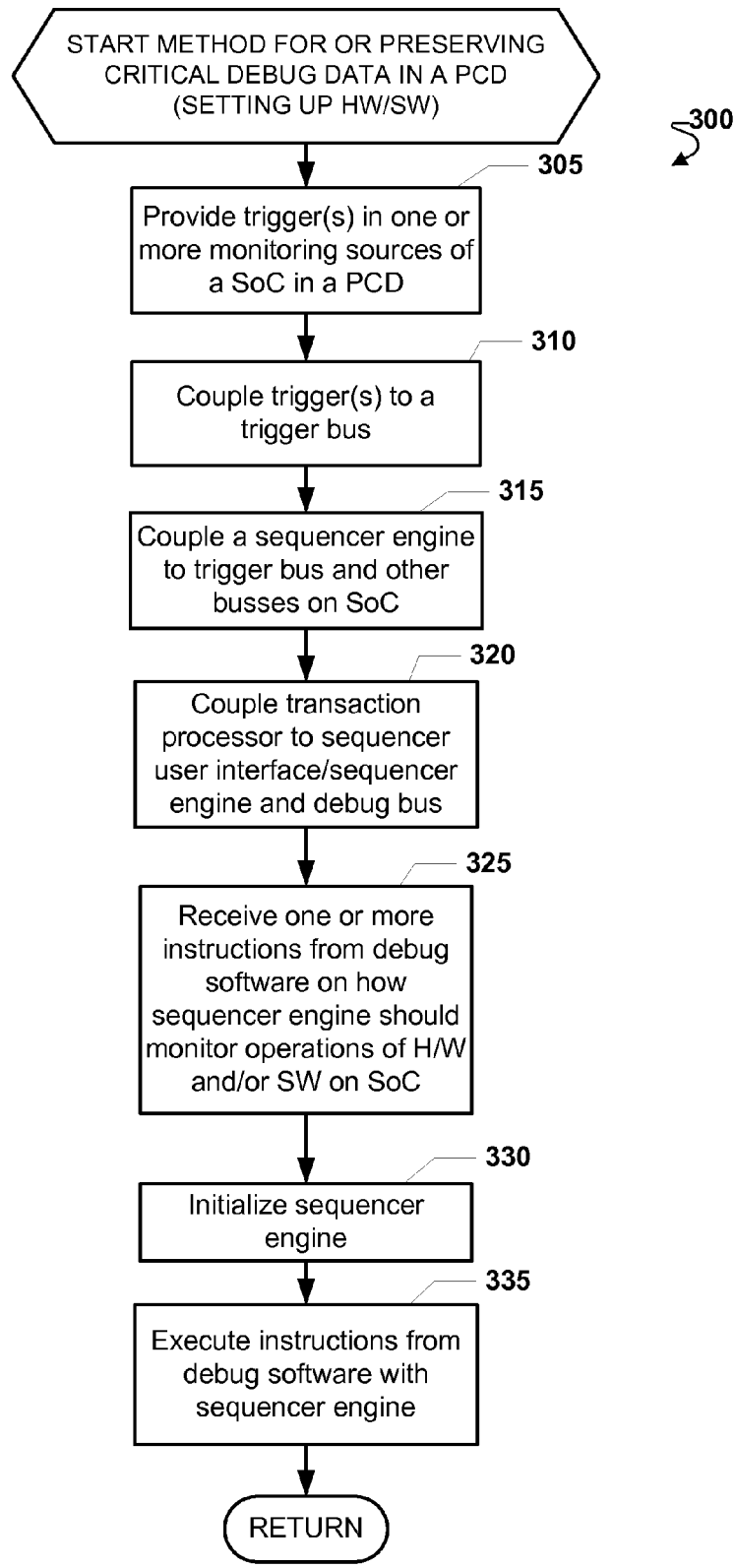
FIG. 3 is a flowchart illustrating a method for storing critical debug data in a portable computing device that includes setting up hardware and software for carrying out the method.

FIG. 3 is a flowchart illustrating a method 300 for storing critical debug data in a PCD 100 that includes setting up hardware and software in the PCD 100 for carrying out the method 300. Block 305 is the first step of method 300 in which one or more triggers 257 are provided in one or more SOC monitoring sources 254 as described above and illustrated in FIG. 2.

Next, in block 310, each trigger 257 is coupled to a trigger event bus 225. In block 315, the sequencer engine 200 is coupled to the trigger event bus 225 as well as any other buses, such as the AHB bus 245, as described above and illustrated in FIG. 2.

In block 320, a debug bus transaction processor module 195 may be coupled to the sequencer user interface module 193. Specifically, the transaction processor engine 242 of the debug bus transaction processor module 195 may be coupled to the sequencer engine 200 of the sequencer user interface module 193. These two hardware elements may be coupled together by various communication buses 201. The communication buses 201 between the sequencer engine 200 and the transaction processor engine 242 may use frequency synchronizers 233 to adjust for any operating frequency differences between the two hardware elements as described above in connection with FIG. 2.

In block 325, the sequencer engine 200 may receive one or more program instructions from debug software 263 running on a core 110 of an application processor 102A. The debug software 263 may send these program instructions to the sequencer engine 200 over the AHB bus 245. The program instructions may inform how the sequencer engine 200 should monitor operations of hardware and software elements located on the SoC 122 via the triggers 257.

For example, the debug software 263 in block 325 may provide the sequencer engine 200 with a list of certain types of trigger events which should be monitored by each one of the triggers 257. The debug software 263 may also instruct the sequencer engine 200 to produce or generate one or more trace packets, one or more interrupt signals, and/or one or more GPIO signals in response to specific trigger events. An exemplary table of instructions provided by the debug software 263 may include a listing of triggering events in one column, and the type of signals to produce and a second column, such as a trace packets, an interrupt signal, and/or a GPIO signal.

Next, in block 330, the sequencer engine 200 may be initialized after the program instructions have been received. In block 335, the sequencer engine 200 may execute the program instructions received from the debug software 263. The process 300 then returns.

Figure 4A:
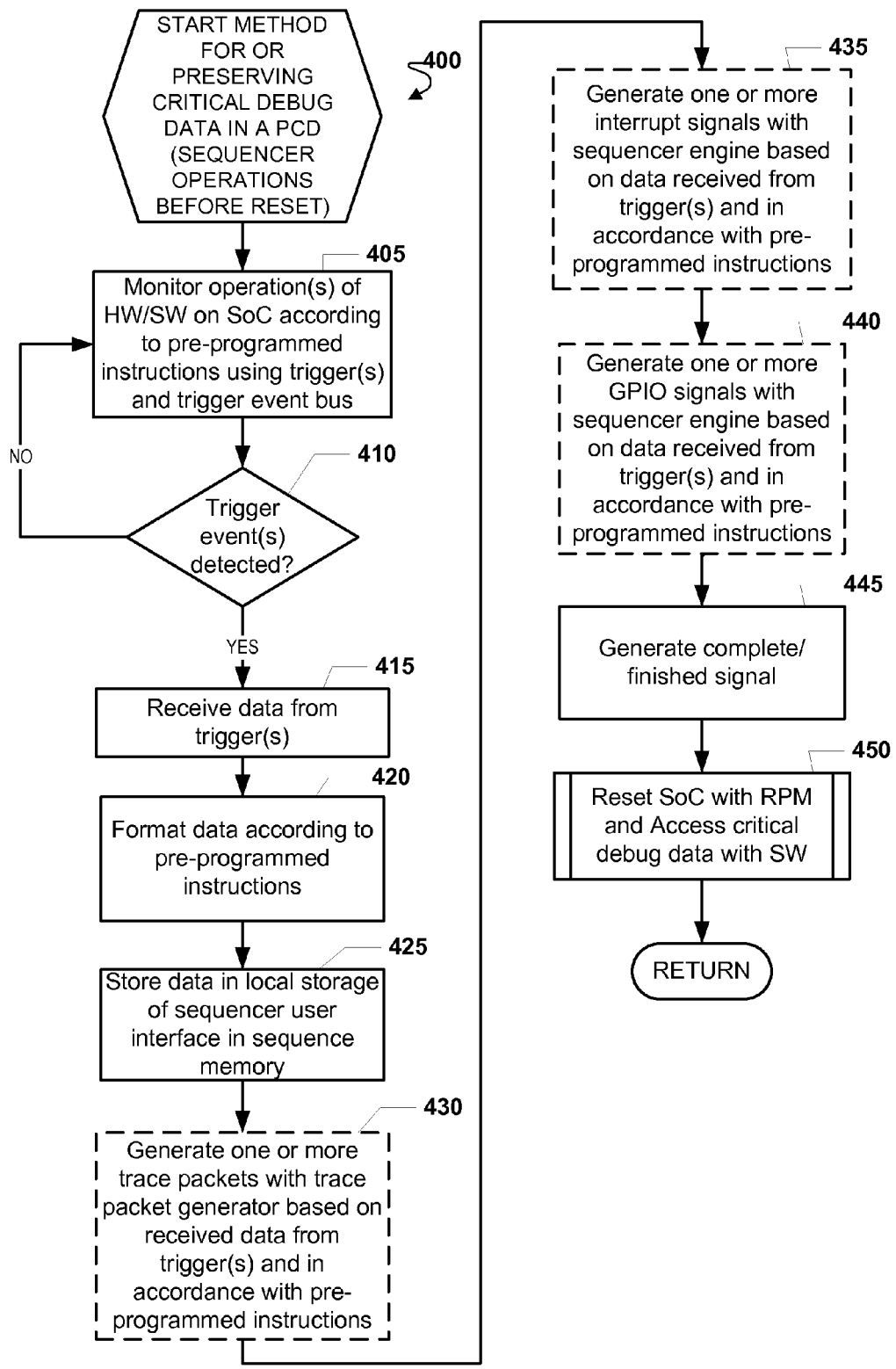
FIG. 4A is a flowchart illustrating a method for storing critical debug data in a portable computing device that includes operations of a sequencer user interface module as illustrated in FIG. 2.

FIG. 4A is a flowchart illustrating a method 400 for storing critical debug data in a portable computing device 100 that includes operations of a sequencer user interface module 193 as illustrated in FIG. 2. Block 405 is the first step of method 400. In block 405, the sequencer engine 200 which was prepared by method 300 in FIG. 3 described above, may monitor operations of hardware and/or software residing on a SoC 122 according to pre-programmed instructions. The sequencer engine 200 may monitor operations of hardware and/or software using one or more triggers 257 which are coupled to each of the software and hardware elements as well as the trigger an event bus 225.

Next, in decision block 410, the sequencer engine 200 may determine if a trigger event has been detected with the one or more triggers 257. If the inquiry to decision block 410 is negative, then the "NO" branch is followed back to block 405. If the inquiry to decision block 410 is positive, then the "YES" branch is followed to block 415.

In block 415, the sequencer engine 200 may receive data from one or more triggers 257 in response to one or more triggering events. This trigger event data may be communicated along the trigger event bus 225.

Next, in block 420, the sequencer engine 200 may format the trigger event data according to any preprogrammed instructions that were received from the debug software 263 back and method 300 described above in connection with FIG. 3. In block 425, the sequencer engine 200 may store the trigger event data in its sequence local memory storage 206.

Subsequently, in block 430, the sequencer engine 200 may generate one or more trace packets with the trace packet generator 209 based on receive data from triggers 257 and in accordance with preprogrammed instructions received from the debug software 263 during method 300 described above. Block 430 is highlighted with dashed lines to indicate that this step is optional and is dependent on whether the debug software 263 instructs the sequencer engine to produce trace packets in response to predefined/predetermined trigger events that may be selected with the debug software 263 during method 300.

In block 435, the sequencer engine 200 may also generate one or more interrupt signals based on data received from triggers 257 and in accordance with preprogrammed instructions received from the debug software 263 during method 300 described above. Block 435 is also highlighted with dashed lines to indicate that this step is also optional and is dependent on whether the debug software 263 instructs the sequencer engine 200 to produce interrupt signals along the interrupt bus 251 in response to predefined/predetermined trigger events that may be selected with the debug software 263 during method 300.

In block 440, the sequencer engine may also generate one or more GPIO signals based on data received from triggers 257 and in accordance with preprogrammed instructions received from the debug software 263 during method 300 described above. Block 440 is also highlighted with dashed lines to indicate that this step is also optional and is dependent on whether the debug software 263 instructs the sequencer engine 200 to produce GPIO signals via the hardware element multiplexer 212 in response to predefined/predetermined trigger events that may be selected with the debug software 263 during method 300.

Subsequently, in block 445, the sequencer engine 200 may generate a complete or finished signal 445 to indicate that it has finished its program after one or more triggering events. This complete or finished signal generated in block 445 may be communicated to the resource power manager 260 along the AHB bus 245.

Next, in routine 450, the SOC 122 may be reset with the resource power manager 260 in accordance with the complete or finished signal generated in block 445. The debug software 263 at this stage may then access the critical debug data in the sequence local memory storage 206 contained within the sequencer user interface model 193. Further details about routine 450 will be described below in connection with FIG. 4B. The method 400 then returns.

Figure 4B:
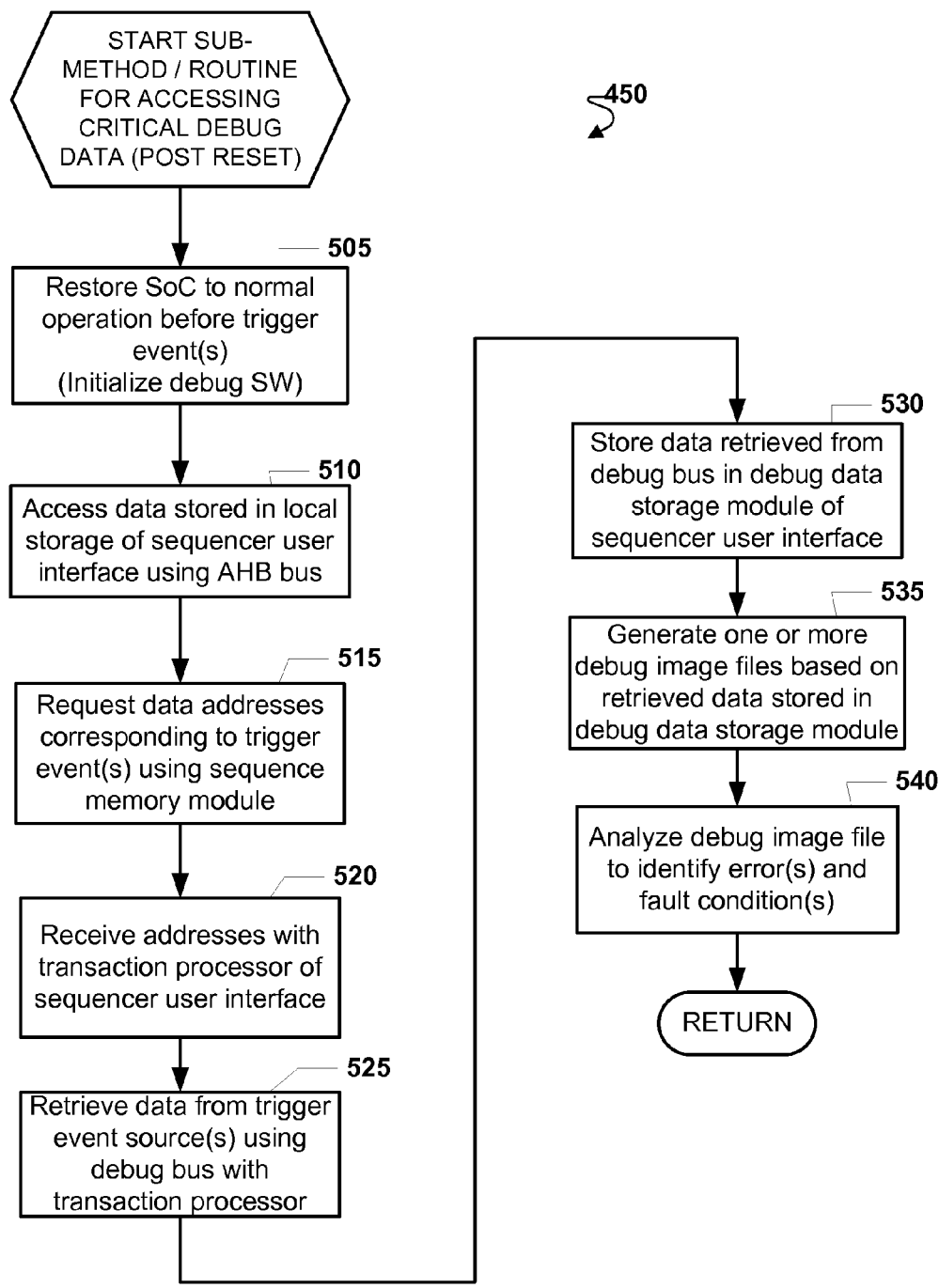
FIG. 4B is a flowchart illustrating a sub-method or routine of the method illustrated in FIG. 4A and includes accessing and analyzing critical debug data stored by the sequencer user interface module of FIG. 2.

FIG. 4B is a flowchart illustrating a sub-method or routine 450 of the method 400 illustrated in FIG. 4A and includes accessing and analyzing critical debug data stored by the sequencer user interface module 193 of FIG. 2. Block 505 is the first step of sub method or routine 450. In block 505, the SOC 122 is restored to normal operating conditions that existed before one or more trigger events that may have been detected by triggers 257. The SOC 122 may be restored by the resource power manager 260. Also in this block 505, the debug software 263 may be initialized by its core 110 of the application CPU 102A.

Next, in block 510, the debug software 263 may access the trigger data stored in the sequence local memory module 206. As noted previously, this trigger data stored in the sequence local memory module 206 may be of an abbreviated form and may not contain a significant amount of data for debugging or correcting errors on the SOC 122. The trigger data stored in the sequence local memory module 206 may comprise pointers or addresses such that the debug software 263 may request larger data sets as will be described below. This trigger data stored in the sequence local memory module 206 may be accessed by the debug software by using the AHB bus 245 which is coupled to the sequencer engine 200.

Next, in block 515, using the AHB bus 245, the debug software 263 may instruct the sequencer engine 200 to provide the data addresses of the trigger events stored in the sequence local memory module 206 to the debug bus transaction processor module 195. In block 520, the address register 236 of the debug bus transaction processor module 195 may receive the addresses relayed by the sequence local memory module 206 and the sequencer engine 200 via bus 201A.

In block 525, the transaction processor engine 242 may issue commands to the debug bus 248 in order to retrieve fuller or more complete data from the trigger event sources (such as the hardware and/or software) which caused one or more trigger events that were detected by the triggers 257. The transaction processor engine 242 may relay addresses to the debug bus 248 that correspond to software and/or hardware elements. The request originating from the sequencer engine 200 via the debug software 263 may further include identity information with respect to what hardware and/or software caused a trigger condition to occur as well as at what stage and/or line number at which a trigger condition occurred. The more fuller or complete trigger event data that is retrieved at this stage 525 may be characterized as debug data. Meanwhile, as described above, trigger event data may comprise information which is less robust relative to debug data.

As but one example, trigger event data may comprise the name of a software element causing a fault as well as a line number in software code which a fault occurred. Trigger event data may comprise a source of a fault condition which may be in the form of interrupt/error/status change as understood by one of ordinary skill in the art.

The debug data may comprise the name of the software element causing the fault as well as the name of the software and/or hardware elements which were being instructed during the fault. The debug data may further comprise several lines of code that were executed prior to the specific line of code that caused the fault to occur as understood by one of ordinary skill in the art.

In block 530, the debug data is retrieved from software and/or hardware that caused one or more trigger events, this debug data is relayed from the debug bus 248 to the transaction processor engine 242. The transaction processor engine 242 relays the debug data through its data register across the communication bus 201 to the data debug local memory storage 203 contained within the sequencer user interface module 193.

In block 535, the debug software 263 may access the debug data stored in the debug data local memory storage 203 and generate one or more debug image files as understood by one of ordinary skill in the art. In block 540, the debug software to 63 may analyze the one or more debug image files to identify the cause(s) or root(s) of the error(s) or fault condition(s). After block 540, the sub method or routine 450 may return back to block 405 of FIG. 4A.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any tangible medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of tangible computer-readable media.

Although selected aspects have been illustrated and described in detail, it will be understood that various substitutions and alterations may be made therein without departing from the scope of the disclosure, as defined by the following claims.

What is claimed is:

1. A method for system on a chip internal debugging in a portable computing device, comprising:
    coupling one or more triggers to sources of a system on a chip of the portable computing device, the sources monitoring the system on a chip for status conditions;
    coupling the one or more triggers to a trigger bus;
    coupling a sequencer engine to the trigger bus and to a communication bus;
    receiving one or more instructions from the communication bus by the sequencer engine for determining how the sequencer engine monitors the one or more triggers and preserves data received from the one or more triggers, wherein the sequencer engine receives the one or more instructions prior to receiving data from the one or more triggers;
    receiving trigger event data from the one or more triggers by the sequencer engine over the trigger bus, the trigger event data comprising information used to determine the cause of the trigger event; and
    storing the trigger event data received from the one or more triggers by the sequencer engine in local memory storage coupled to the sequencer engine, wherein the sequencer engine stores the received trigger event data in accordance with the one or more instructions received by the sequencer engine from the communication bus.

2. The method of claim 1, wherein each trigger comprises a programmable logic element.

3. The method of claim 1, further comprising generating at least one of a trace packet, an interrupt signal, and a general purpose input/output signal with the sequencer engine in response to receiving data from one or more triggers and in accordance with the one or more instructions received by the sequencer engine from the communication bus.

4. The method of claim 1, wherein the trigger event data received from the one or more triggers is received before a system reset.

5. The method of claim 1, further comprising:
    accessing the local memory storage;
    generating a request for debug data based on the trigger event data contained in the local memory storage; and
    transmitting the request for debug data over a debug bus.

6. The method of claim 1, further comprising coupling a processor to the communication bus, and relaying data over the communication bus between the sequencer engine and software running on the processor.

7. The method of claim 6, wherein the software running on the processor comprises software for debugging the system on chip.

8. The method of claim 1, wherein the one or more sources comprise at least one of software and hardware for monitoring the system on chip for status information.

9. The method of claim 8, wherein the one or more sources comprise at least one of: a system watchdog timer module, an advanced high performance bus ("AHB") timeout module, a fabric timeout module, a debug logic module, and a cross trigger interface ("CTI") module.

10. The method of claim 1, further comprising resetting the system on chip with a resource power manager.

11. A computer system for system on a chip internal debugging in a portable computing device, the system comprising:
    a processor operable for:
        coupling one or more triggers to sources of a system on a chip of the portable computing device, the sources monitoring the system on a chip for status conditions;
        coupling the one or more triggers to a trigger bus;
        coupling a sequencer engine to the trigger bus and to a communication bus;
        receiving one or more instructions from the communication bus by the sequencer engine for determining how the sequencer engine monitors the one or more triggers and preserves data received from the one or more triggers, wherein the sequencer engine receives the one or more instructions prior to receiving data from the one or more triggers;
        receiving trigger event data from the one or more triggers by the sequencer engine over the trigger bus, the trigger event data comprising information used to determine the cause of the trigger event; and
        storing the trigger event data received from the one or more triggers by the sequencer engine in local memory storage coupled to the sequencer engine, wherein the sequencer engine stores the received trigger event data in accordance with the one or more instructions received by the sequencer engine from the communication bus.

12. The system of claim 11, wherein each trigger comprises a programmable logic element.

13. The system of claim 11, wherein the processor is further operable for generating at least one of a trace packet, an interrupt signal, and a general purpose input/output signal with the sequencer engine in response to receiving data from one or more triggers and in accordance with the one or more instructions received by the sequencer engine from the communication bus.

14. The system of claim 11, wherein the trigger event data received from the one or more triggers is received before a system reset.

15. The system of claim 11, wherein the processor is further operable for:
    accessing the local memory storage;
    generating a request for debug data based on the trigger event data contained in the local memory storage; and
    transmitting the request for debug data over a debug bus.

16. The system of claim 11, wherein the processor is further operable for:
    coupling a processor to the communication bus, and relaying data over the communication bus between the sequencer engine and software running on the processor.

17. The system of claim 16, wherein the software running on the processor comprises software for debugging the system on chip.

18. The system of claim 11, wherein the one or more sources comprise at least one of software and hardware for monitoring the system on chip for status information.

19. The system of claim 18, wherein the one or more sources comprise at least one of: a system watchdog timer module, an advanced high performance bus ("AHB") timeout module, a fabric timeout module, a debug logic module, and a cross trigger interface ("CTI") module.

20. The system of claim 11, wherein the processor is operable for resetting the system on chip with a resource power manager.

21. A computer system for system on a chip internal debugging in a portable computing device, the system comprising:
    means for coupling one or more triggers to sources of a system on a chip of the portable computing device, the sources monitoring the system on a chip for status conditions;

means for coupling the one or more triggers to a trigger bus;

means for coupling a sequencer engine to the trigger bus and to a communication bus;

means for receiving one or more instructions from the communication bus by the sequencer engine for determining how the sequencer engine monitors the one or more triggers and preserves data received from the one or more triggers, wherein the sequencer engine receives the one or more instructions prior to receiving data from the one or more triggers;

means for receiving trigger event data from the one or more triggers by the sequencer engine over the trigger bus, the trigger event data comprising information used to determine the cause of the trigger event; and means for storing the trigger event data received from the one or more triggers by the sequencer engine in local memory storage coupled to the sequencer engine, wherein the sequencer engine stores the received trigger event data in accordance with the one or more instructions received by the sequencer engine from the communication bus.

22. The system of claim 21, wherein each trigger comprises a programmable logic element.

23. The system of claim 22, further comprising means for generating at least one of a trace packet, an interrupt signal, and a general purpose input/output signal with the sequencer engine in response to receiving data from one or more triggers and in accordance with the one or more instructions received by the sequencer engine from the communication bus.

24. The system of claim 21, wherein the trigger event data received from the one or more triggers is received before a system reset.

25. The system of claim 21, further comprising:
means for accessing the local memory storage;
means for generating a request for debug data based on the trigger event data contained in the local memory storage; and
means for transmitting the request for debug data over a debug bus.

26. The method of claim 21, further comprising means for coupling a processor to the communication bus, and means for relaying data over the communication bus between the sequencer engine and software running on the processor.

27. The system of claim 26, wherein the software running on the processor comprises software for debugging the system on chip.

28. The system of claim 21, wherein the one or more sources comprise at least one of software and hardware for monitoring the system on chip for status information.

29. The system of claim 28, wherein the one or more sources comprise at least one of: a system watchdog timer module, an advanced high performance bus ("AHB") timeout module, a fabric timeout module, a debug logic module, and a cross trigger interface ("CTI") module.

30. The system of claim 21, further means for resetting the system on chip.

31. A computer program product comprising a non-transitory, tangible computer usable medium having a computer readable program code embodied therein, said computer readable program code adapted to be executed to implement a method for system on a chip internal debugging in a portable computing device, said method comprising:

coupling one or more triggers to sources of a system on a chip of the portable computing device, the sources monitoring the system on a chip for status conditions;

coupling the one or more triggers to a trigger bus;

coupling a sequencer engine to the trigger bus and to a communication bus;

receiving one or more instructions from the communication bus by the sequencer engine for determining how the sequencer engine monitors the one or more triggers and preserves data received from the one or more triggers, wherein the sequencer engine receives the one or more instructions prior to receiving data from the one or more triggers;

receiving trigger event data from the one or more triggers by the sequencer engine over the trigger bus, the trigger event data comprising information used to determine the cause of the trigger event; and storing the trigger event data received from the one or more triggers by the sequencer engine in local memory storage coupled to the sequencer engine, wherein the sequencer engine stores the received trigger event data in accordance with the one or more instructions received by the sequencer engine from the communication bus.

32. The computer program product of claim 31, wherein each trigger comprises a programmable logic element.

33. The computer program product of claim 31, wherein the program code implementing the method further comprises: generating at least one of a trace packet, an interrupt signal, and a general purpose input/output signal with the sequencer engine in response to receiving data from one or more triggers and in accordance with the one or more instructions received by the sequencer engine from the communication bus.

34. The computer program product of claim 31, wherein the trigger event data received from the one or more triggers is received before a system reset.

35. The computer program product of claim 31, wherein the program code implementing the method further comprises:
accessing the local memory storage;
generating a request for debug data based on the trigger event data contained in the local memory storage; and
transmitting the request for debug data over a debug bus.

36. The computer program product of claim 31, wherein the program code implementing the method further comprises: coupling a processor to the communication bus, and relaying data over the communication bus between the sequencer engine and software running on the processor.

37. The computer program product of claim 36, wherein the software running on the processor comprises software for debugging the system on chip.

38. The computer program product of claim 31, wherein the one or more sources comprise at least one of software and hardware for monitoring the system on chip for status information.

39. The computer program product of claim 38, wherein the one or more sources comprise at least one of: a system watchdog timer module, an advanced high performance bus ("AHB") timeout module, a fabric timeout module, a debug logic module, and a cross trigger interface ("CTI") module.

40. The computer program product of claim 31, wherein the program code implementing the method further comprises: resetting the system on chip with a resource power manager.

* * * * *